Aug. 20, 1940.   R. L. BRADFORD   2,212,466
PRESSURE LEAKAGE GAUGE
Filed Aug. 15, 1938
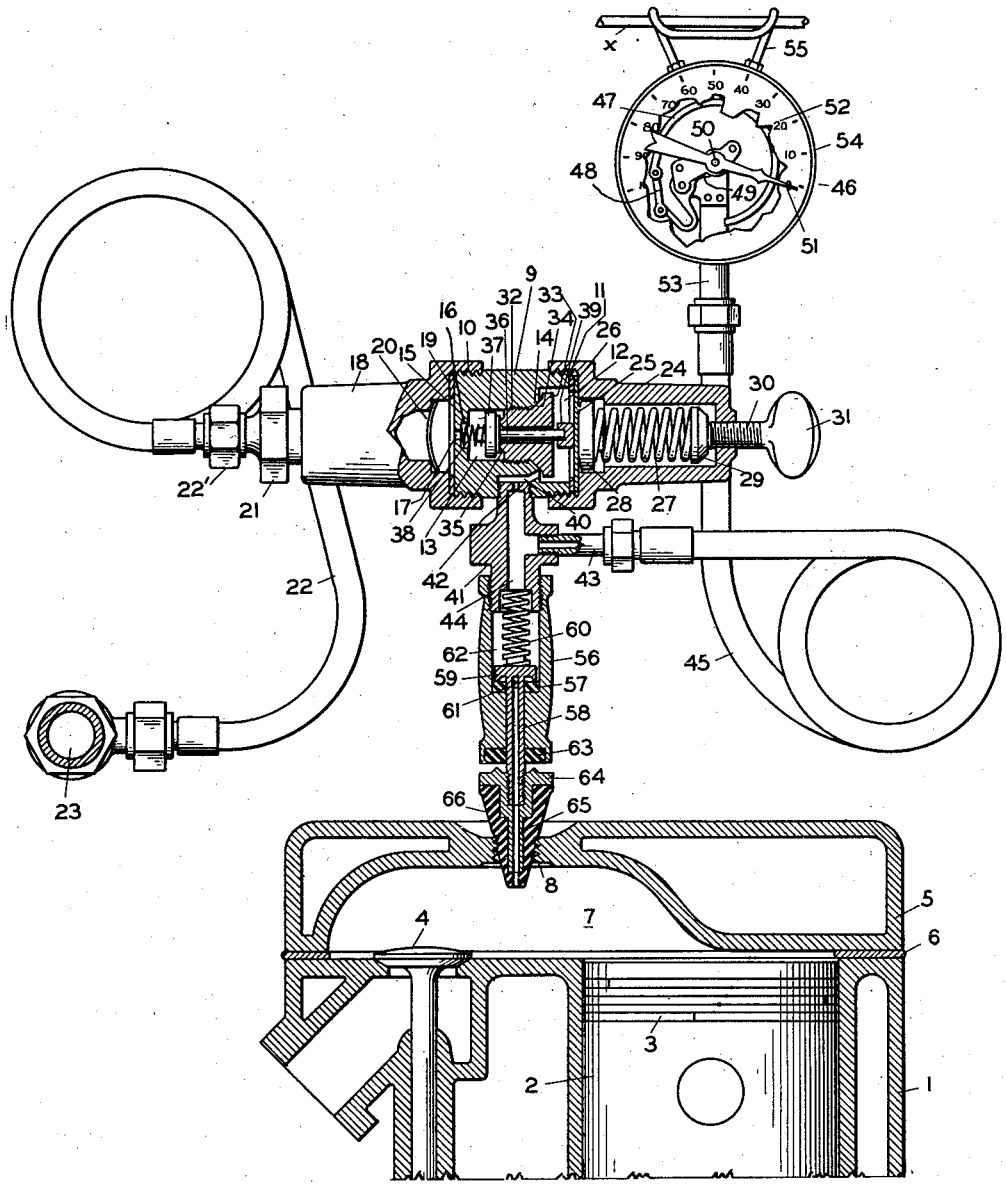
INVENTOR:
ROBERT L. BRADFORD
BY
ATTORNEY Patented Aug. 20, 1940

2,212,466

UNITED STATES PATENT OFFICE 2,212,466

PRESSURE LEAKAGE GAUGE

Robert L. Bradford, San Francisco, Calif.

Application August 15, 1938, Serial No. 224,987

4 Claims. (Cl. 73—51)

This invention relates to improvements in pressure leakage gauges and, more particularly, to motorstats.

Among the objects of the invention is to provide a meter for indicating the condition of pressure sealing means, with special reference to engines, pumps, tanks, and the like.

Another object is to establish a calibrated standard of measurement, and give a definite visual reading of pressure losses without computation.

Another object is to measure pressure losses in exact terms.

Another object is to indicate the location and the cause of such losses.

A further object is to give a full reading on a single dial pressure gauge.

Other objects and advantages will appear as the description progresses.

In this specification and the accompanying drawings, the invention is disclosed in its adaptation to internal combustion engines. It is to be understood, however, that it is not limited to this form, because it may be embodied in modifications within the purview of the claims following the description.

In the one sheet of drawings:

A motorstat constructed in accordance with this invention is shown in vertical section in operative relation to a similar section of the upper portion of a conventional internal combustion motor, the pressure gauge being in its balanced operative condition.

In detail, the construction illustrated in the drawing comprises the water jacketed cylinder 1, having the piston 2 reciprocal therein. This piston is provided with the pressure sealing rings 3. The usual intake and exhaust valves, such as 4, are located adjacent the cylinder.

The water jacketed head 5 is bolted to the cylinder block with the intermediate gasket 6, and has the combustion chamber 7 overhanging the cylinder opening and the intake and exhaust valves. The spark plug opening 8 is provided in the cylinder head and leads into the combustion chamber. All of which is conventional practice.

The motorstat comprises the cylindrical center block 9, threaded on each end at 10, 11. This block is center bored from one end to form the reservoir 12, and counterbored to form the concentric chamber 13, with the chamfered rim at 14. The opposite end 15 of the block is countersunk to form a spring socket at 16, surrounding the inlet 17 into the chamber 13.

The end cap 18 is screwed on to the end 10 of the center block and sealed by the compressed gasket 19. This cap is recessed to receive the strainer 20 forced therein. The outer end of the cap is threaded to receive the reducer 21, having the hose coupling 22' of the hose 22 screwed thereon. The opposite end of the hose has a similar coupling connecting it to the source of air pressure in the service pipe 23. It is usual to provide a self closing service valve at this point, not shown, so that the hose 22 may be readily attached and detached.

A similar cap 24 is threaded on the opposite end 11 of the center block and sealed off from the reservoir 12 by the flexible diaphragm 25 and the interposed chafing ring 26. A pressure regulator is assembled within the cap 24 and consists of the expansion spring 27, having the convex head 28 on one end and bearing against the inner face of the diaphragm 25, and the concave head 29 on its opposite end to receive the tapered end of the thumb screw 30 threaded in the end of the cap 24. This screw has the flat head 31 to facilitate manual turning of the screw to vary the tension of the spring 27 against the diaphragm 25.

The end of the chamber 13 is sealed by the plug 32 screwed thereinto and having the polygonal head 33 and the tapered shoulder 34 fitting the chamfer 14. This plug has the annular valve seat 35 and is axially drilled to pass the stem 36 on the valve head 37 with a surface of yielding material in operative relation to the valve seat 35. The spring 38 expanding between the socket 16 and the valve head 37 normally urges the valve into closed position. The protruding end of this valve stem 36 has the convex head 39 bearing against the diaphragm 25.

The center block 9 has the by-pass 40 leading into the reservoir 12. The reducing nipple 41 is screwed into the side of the block 9 and has the restricted opening 42 leading from the by-pass 40. The side outlet 43, open to the center bore 44 in the nipple 41 has the hose 45 attached thereto which is connected to the pressure gauge 46. The gauge illustrated operates by the tendency of a bent oval tube 47 to unbend under pressure. The free end of this tube is linked at 48 to the end of the gear segment 49, enmeshed with a pinion on the staff 50, having the index arrow 51 thereon cooperating with the graduated dial 52 fixed to the stem 53 of the gauge. Other forms of pressure gauges may be substituted for the conventional type shown and described. The gauge case 54 has the hook 55 adapted to suspend the gauge at any convenient place, such as the brace rod $x$ of an automobile radiator.

The tubular sleeve 56 is threaded on the outer end of the nipple 41 and has the internal yielding valve seat 57 intermediate its length. The sliding plunger 58 has the annular valve 59 in operative relation to the valve seat 57. The expansion spring 60 has its inner end seated in the nipple 41 and its other end bearing against the valve 59 to maintain the valve normally seated. The hollow plunger 58 has the by-pass 61 which is exposed within the chamber 62 when the valve 59 is unseated.

The outer end of the sleeve 56 has the yielding valve seat 63 therein. The annular valve 64 is screwed on the end of the plunger in operative relation to the valve seat 63. The extended hollow stem 65 of this valve has the tapered rubber adapter 66 fixed thereon and adapted to enter and seal the spark plug hole 8 while the air service from 23 is flowing into the combustion chamber 7.

The invention operates substantially as follows: The air pressure, in excess of fifty pounds per square inch, flows from the service pipe 23 and the intermediate conduits past the valve 37 into the reservoir 12. As the pressure rises in the reservoir 12, the diaphragm 25 moves outward allowing the valve 37 to close under the tension of the spring 38 preventing admission of additional air into the reservoir.

From the reservoir 12, the air flows through the by-pass 40 and the restricted opening 42 into the chamber 44 and thence to the pressure gauge. The pressure unbends the tube 47 and moves the arrow 51 out of its initial position as shown in the drawing.

The thumb screw 30 is then manipulated to increase the tension on the spring 27. This forces the diaphragm 25 inward, unseating the valve 37 to permit the entry of additional air from the service line into the reservoir 12 which is indicated on the pressure gauge dial 52. The thumb screw 30 is screwed inward until the pressure in the system rises to the point that the arrow 51 is brought to "zero" on the dial 52. This is equivalent to a pressure of approximately fifty pounds in the reservoir 12. There is an equilibrium between the spring 38 and the air pressure against the diaphragm 25 and the regulating spring 27. Should the pressure in the reservoir 12 commence to fall, the spring 27 will overcome the reduced pressure on the opposite side of the diaphragm 25 and open the valve 37 to restore the reservoir pressure to the predetermined value.

With the piston 2 at the top of its stroke and the valves at 4 closed, the operator grasps the caps 18, 24 and forces the adaptor 66 into the spark plug hole 8. This unseats the valve 59, closes the valve 63, 64 and admits air from the chamber 44, through the by-pass 61 and the hollow plunger 58 into the combustion chamber 7.

If the piston rings 3, the valves 4, and the gasket 6 allow only the tolerated leakage permissible in a motor in excellent condition, the pressure in the chamber 44 will rise very nearly to the pressure in the reservoir 12 since the restricted opening 42 will supply air as rapidly as its leaks from the combustion chamber 7 with very little pressure differential between the reservoir 12 and the chamber 44. The pressure gauge arrow 51 will consequently continue to register substantially "zero" indicating zero leakage in excess of that normally tolerated and consequently one hundred per cent efficiency in the engine pressure sealing.

Should there be excess leakage at the pressure sealing elements 3, 4, 6, the pressure in the chamber 44 will drop until the pressure difference in the reservoir 12 and the chamber 44 becomes sufficiently great to cause air to issue through the restricted opening 42 at the rate it is leaking from the motor combustion chamber 7. The greater the leakage from the combustion chamber, the lower will be the pressure in the chamber 44. The drop in pressure in the chamber 44 also proportionally bleeds the pressure from the flexible tube 47 in the pressure gauge causing the arrow 51 to advance from zero to the graduation on the dial 52 indicating the relative degree of leakage and inefficiency in the pressure sealing means.

By slowly moving the piston 2 downward, any change registered on the gauge will indicate at what point in the stroke the piston rings decrease in their ability to seal the pressure. The manner in which the reading of the gauge varies enables the detection of various conditions such as the cylinder walls being worn out of round, scored, tapered, or otherwise imperfect.

After testing the total leakage from the combustion chamber 7, oil is introduced into the cylinder 1 on top of the piston 2 to create a perfect seal at this point. The reading of the gauge will then indicate the condition of the valves at 4. Gasket leakage will usually be audible externally, or, by bubbles in the radiator of water cooling system. Cracks in the walls between cylinders will usually be indicated by hissing in the adjacent cylinder not under pressure. This and other leak locating tests are well known to those skilled in the art.

Having thus described this invention, what I claim and desire to secure by Letters Patent is:

1. A leakage gauge including a block having a pressure reservoir therein; a spring seated inlet valve intermediate said reservoir and a source of fluid pressure; a pressure regulator in operative relation to said valve and reservoir; a sleeve projecting from said block and communicating with said reservoir through a restricted opening; a pressure gauge connected to said sleeve; an outlet valve in said sleeve having a hollow plunger stem projecting beyond said sleeve and slidable relative thereto for opening and closing said valve; an external valve on said stem in spaced relation to a valve seat on said sleeve and adapted to be closed when said outlet is opened; and a tapered adapter of yielding material on said external valve.

2. A leakage gauge including a block having a pressure reservoir therein; an inlet valve intermediate a source of fluid pressure and said reservoir; a pressure regulator in operative relation to said valve and reservoir; a sleeve communicating with said reservoir through a restricted opening; a pressure gauge connected to said sleeve; a hollow plunger stem slidable in said sleeve and projecting therefrom; a valve providing communication between said sleeve and the interior of said stem and arranged to be opened by moving said stem inwardly with respect to said sleeve; resilient means urging the valve controlled by said stem into closed position; means on said stem adapted to engage an opening in the container to be tested; and a valve surrounding said stem and interposed between said sleeve and said container engaging means and adapted to be closed when the valve inside the sleeve is opened.

3. A leakage gauge including a block having a pressure reservoir therein; a spring seated valve in an inlet intermediate a source of fluid pressure and said reservoir; a pressure regulator in operative relation to said valve and reservoir; a sleeve communicating with said reservoir through a restricted opening; a pressure gauge connected to said sleeve; a valve seat within said sleeve; a hollow plunger stem slidable in said sleeve and projecting therefrom; a valve on said stem arranged to cooperate with said valve seat and adapted to be opened by moving said stem inwardly to provide communication between said sleeve and the interior of said stem; resilient means in said sleeve urging said stem outwardly; means on said stem adapted to engage an opening in the container to be tested; and a valve surrounding said stem and interposed between said sleeve and said container engaging means and adapted to be closed when the valve inside the sleeve is opened.

4. A leakage tester having a hollow center block with a chamber therein; alined end caps fixed to opposite sides of said block; a hollow sleeve having a calibrated opening and projecting laterally from said block; means for delivering fluid pressure through one of said caps to said block; a pressure regulator in the other of said caps; a valve in said block cooperating with said pressure regulator to admit pressure to said chamber; inner and outer valve seats on the outer end of said sleeve; a hollow valve stem projecting from said sleeve and having a valve cooperating with said inner seat; a tapered resilient adapter on said stem having a valve cooperating with said outer seat to close when the valve cooperating with said inner seat is opened; and a pressure gauge connected with said sleeve intermediate said calibrated opening and said inner valve.

ROBERT L. BRADFORD.